March 17, 1942.  H. H. BATES  2,276,643
SYSTEM FOR PREHEATING AND ANNEALING
Filed Aug. 3, 1938  3 Sheets-Sheet 2

WITNESSES:
E. J. Olbaheim
G. V. Giolma

INVENTOR
Harry H. Bates.
G. M. Crawford
ATTORNEY

March 17, 1942. H. H. BATES 2,276,643
SYSTEM FOR PREHEATING AND ANNEALING
Filed Aug. 3, 1938 3 Sheets-Sheet 3

WITNESSES:
E. F. Oberheim
F. V. Giolma

INVENTOR
Harry H. Bates.
BY G. W. Crawford
ATTORNEY

Patented Mar. 17, 1942

2,276,643

UNITED STATES PATENT OFFICE 2,276,643

SYSTEM FOR PREHEATING AND ANNEALING

Harry H. Bates, Ridley Park, Pa., assignor to Westinghouse Electric & Manufacturing Company, East Pittsburgh, Pa., a corporation of Pennsylvania Application August 3, 1938, Serial No. 222,801

11 Claims. (Cl. 219—11)

My invention relates, generally, to heating apparatus, and, in particular, to apparatus for preheating and annealing in connection with a welding operation.

It is generally an object of my invention to control the preheating and annealing of metal in the weld zone between members which are being united by a welding operation.

More specifically, it is an object of my invention to provide for controlling preheating and annealing operations which are being performed in connection with a welding operation, both in accordance with the temperatures of the members upon which the welding operation is being performed and in accordance with the performance of the welding operation.

Another object of my invention is to facilitate the securing of high strength welds when welding alloy metals, by providing control means for controlling preheating and annealing operations of the members being welded in accordance with the welding operation.

A further object of my invention is to provide a unified control system for controlling the preheating and annealing operations on members by applying flexible heating elements in close conformity with the members, and separately controlling the connections of the heating elements to a source of current in accordance with the temperature of the member with which the heating element is associated.

A still further object of my invention is to provide a flexible heating element which may be applied adjacent to the zone of a welding operation on members being welded, for preheating and annealing the zone of the weld by resistance or/and induction heating, without requiring removal of the members from their location.

Another object of my invention is to provide a simple and efficient flexible resistance heating element for use in preheating and annealing operations in connection with a welding operation which may be readily applied to the members being welded, and which will not be easily damaged in use.

Other objects will, in part, be obvious, and will, in part, appear hereinafter.

In practicing my invention, a pair of bare flexible heating elements may be applied to the members which are to be joined by the welding operation, being for example, wrapped about the members upon a layer of heat-resisting insulating material adjacent to the point of welding, and disposed to be separately connected to a source of alternating current by control means for preheating and annealing the members adjacent to the weld zone by inductive and resistance heating. Preferably, the operation of the control means in connecting the heating members to the source may be controlled in accordance with the welding operation, so that when the welding operation is being performed the heating elements will be automatically disconnected from the source, and in order to control the temperature of the members adjacent to the point of welding so as to obtain the desired characteristics in the metal, the connection of the heating elements to the source may be individually controlled by some suitable heat responsive means such as, for example, a multiple point control indicating pyrometer, which may be connected to thermocouples located in contact with the members being welded, in the proximity of the weld zone.

For a more complete description of the nature and scope of my invention, reference may be had to the following detailed description, taken in connection with the accompanying drawings in which.

Figure 1:
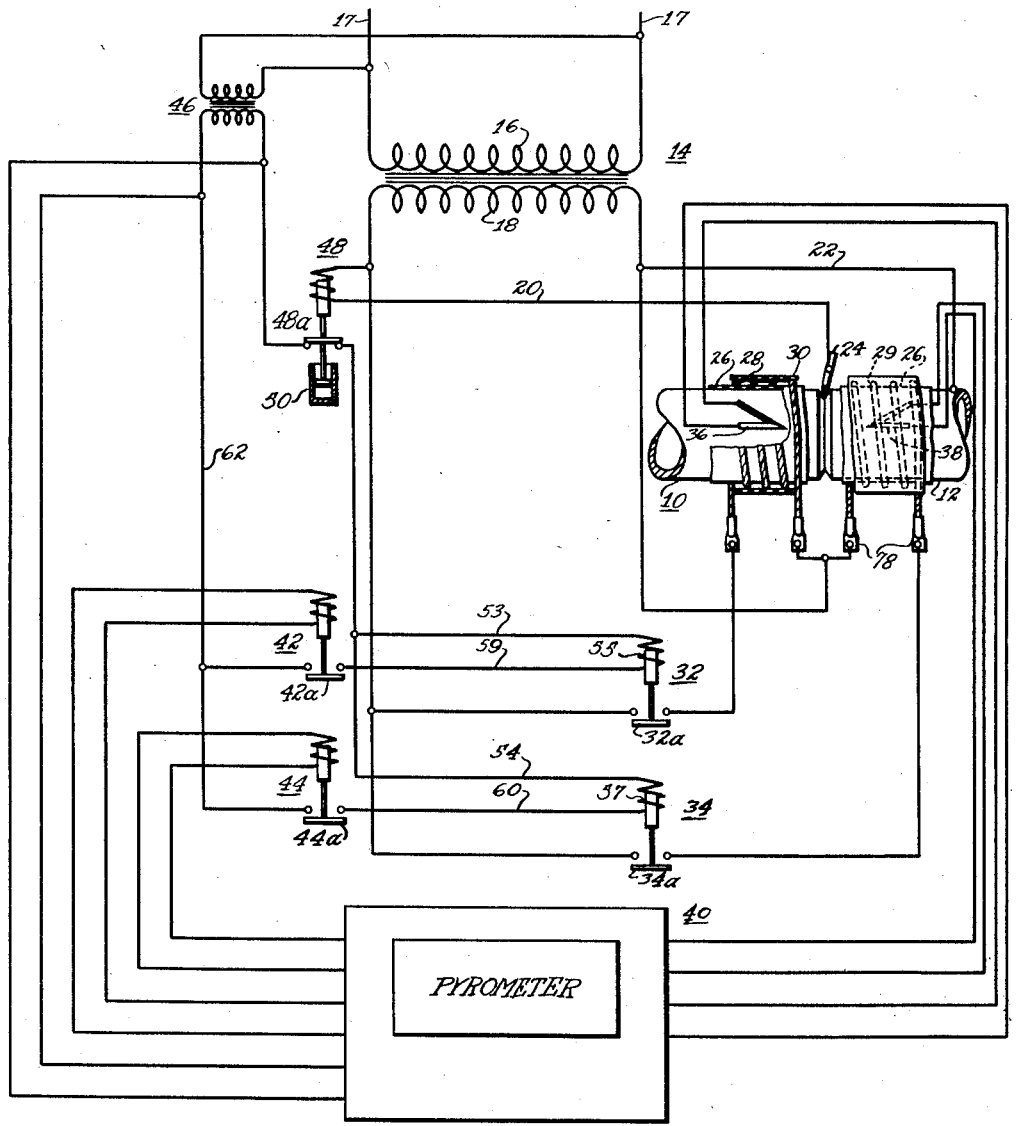
Figure 1 is a diagrammatic view of a welding system embodying a preferred form of my invention.

Referring particularly to Fig. 1, the reference numerals 10 and 12 may denote generally a pair of members, comprising, for example, pipes, which are to be joined by a welding operation. Welding current may be supplied by any suitable means, such as the transformer 14, which has a primary winding 16 adapted to be connected to a suitable alternating current source 17, and a secondary winding 18 which is connected to the welding circuit comprising suitable conductors 20 and 22, a fusible electrode 24, and the pipe member 12.

To provide for suitably preheating the members 10 and 12, possibly prior to the commencement of a welding operation, so as to obtain the desired characteristics in the metal surrounding the weld zone, the members may be wrapped adjacent to the weld zone with a layer of suitable insulating material 26 such as asbestos paper, and bare flexible heating elements 28 and 29, the nature of which will hereafter be explained in detail, may be wound thereon with the turns thereof in spaced relation. If desired, additional heat insulating material 30 may be wrapped upon the spaced turns of the heating elements, to cover them and reduce the radiation and convection losses therefrom.

In order to control the connection of the heating elements to the source, switches 32 and 34 may be provided for connecting the elements 28 and 29 to a source of current, such as the secondary winding 18 of the transformer through contact members 32a and 34a, respectively. Thermocouples 36 and 38, of any form well known in the art, may be disposed in connection with the members 10 and 12, being, for example, tack welded thereto, or inserted beneath the insulating wrapping 26 in any suitable manner so as to be protected from the influence of radiant heat and responsive to temperature changes of the members themselves. By utilizing a pyrometer device 40, of any well-known type, comprising preferably a contact-making milli-voltmeter which is automatically connected by internal transfer means alternately to one thermocouple and then to the other, so as to provide for controlling the connection of control relays 42 and 44 to a suitable source such as the control transformer 46, which may also be used to provide the power for operating the transfer mechanism of the pyrometer device, and connecting the control relays 42 and 44 for completing energizing circuits for the switches 32 and 34, through contact members 42a and 44a, respectively, the heating elements 28 and 29 may be effectively energized for maintaining the temperature of the members at any desired value for which the pyrometer device may be set.

In order to utilize but a single source for energizing the heating elements 28 and 29 and also the welding circuit it has been found desirable to disconnect the heating load from the source during the performance of a welding operation. By providing a current responsive relay 48 for interrupting the operating circuit of the switches 32 and 34 through contact members 48a while the welding circuit is energized, this result may be satisfactorily attained.

In this manner, the pyrometer device 40 may be adjusted to maintain the members at any desired temperature, and when a welding operation is commenced, the heating load will be disconnected from the source until the termination of the welding operation. By providing the relay 48 with time delay means comprising, for example, a dashpot 50, reconnection of the heating load to the source 17 may be delayed for a predetermined interval of time after the cessation of a welding operation, when the pyrometer device 40 may preferably be adjusted to maintain a suitable annealing temperature.

In a normal sequence of operation, the pyrometer device 40 may be set to maintain a desired preheating temperature, and so long as the temperatures of either of the members 10 or 12 remains below the desired value, the pyrometer device will automatically control the operation of the control relays 42 and 44 so that the switches 32 and 34 may be energized from the control transformer 46, through the normally closed contact members 48a of the current responsive relay 48, and by conductors 53 and 54 to the respective operating coils 55 and 57 of switches 32 and 34, then by conductors 59 and 60, contact members 42a and 44a to conductor 62, which connects with transformer 46. Closure of either of the switches 32 or 34 then completes the connection of its associated heating element to the source. Upon completion of the welding circuit by contact of the electrode 24 with either of the members 10 or 12, the relay 48 is energized and operates, interrupting the energizing circuit for the switches 32 and 34 at contact members 48a, so that the heating load is thereby disconnected. The dashpot 50 may prevent reconnection of the heating load upon momentary cessation of welding, by providing a time delay in the reclosing of contact members 48a. A predetermined interval of time after the termination of the welding operation, the contact members 48a close, so that the pyrometer device 40 will then be effective to control an annealing operation of the weld, at some different temperature than maintained during preheating.

Figure 2:
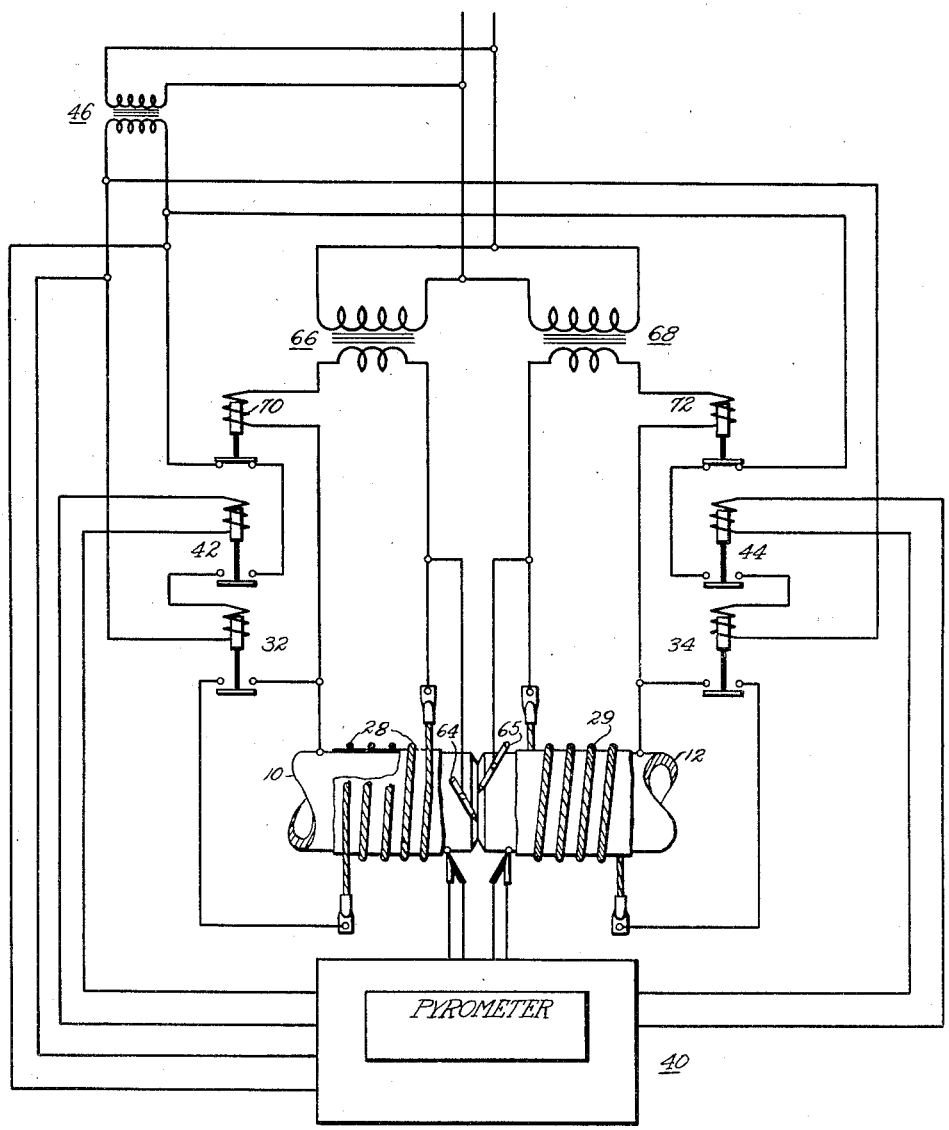
Fig. 2 is a diagrammatic view of a modified form of the invention.

In the embodiment of my invention illustrated in Figure 2, provision may be made for a plurality of welding circuits including fusible electrodes 64 and 65, respectively, which may be connected to separate transformers 66 and 68. Separate heating circuits are provided for heating elements 28 and 29, which are controlled by switches 32 and 34, under the control of the respective control relays 42 and 44, which are operable under the control of a pyrometer device 40, as hereinbefore described. However, as shown, so that two or more operators may work at the same time, separate current responsive relays 70 and 72, respectively, may be provided, for preventing the connection of the heating elements 28 and 29 to their respective transformers 66 and 68 while the welding circuit which is associated with the respective transformer is energized. In other respects this embodiment of the invention is similar to that hereinbefore shown and described in connection with Fig. 1.

As it is in many instances essential in providing for the preheating and annealing of welded joints in the field, to perform such operations when the pipes are located in almost inaccessible places, I have found it preferable to utilize a form of heating element which may be readily applied to the members being welded by simply wrapping it thereabouts in close conformity with the surface thereof, so as to provide for efficiently conducting heat thereto, without having to remove the members from their location.

Figure 4:
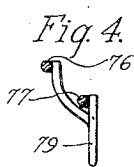
Fig. 4 is a section view of the heating element of Fig. 3, along the line IV—IV.
Figure 3:
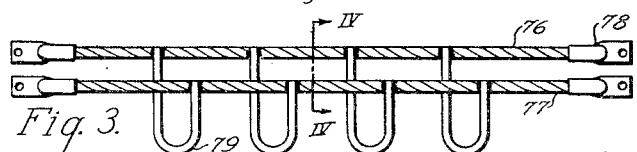
Fig. 3 illustrates one form of flexible heating element which may be used in practicing the invention.

Referring particularly to Figs. 3 and 4, the reference numerals 76 and 77 may denote, respectively, bare flexible conductor cables provided with terminal members 78, for facilitating connection thereof to a source of current, and having a plurality of rigid looped heating elements 79 of a suitable relatively high resistance material which is capable of withstanding relatively high temperatures, securely affixed therebetween in such a manner that the cables may be readily wrapped around a pipe or the like upon a layer of insulating material, so that the heating members 79 will lie substantially flat against the surface of the member to which they are applied and will at the same time maintain the conductor cables 76 and 77 in sufficiently spaced relation to prevent any short-circuiting therebetween.

Figure 5:
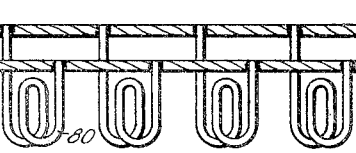
Fig. 5 is an illustration of an alternate form of heating element.

In Fig. 5, the reference numeral 80 denotes an alternative form of looped heating element comprising a plurality of looped turns of a relatively rigid nature, which may be secured to the conductor cables 76 and 77 in any suitable manner, such as, for example, by brazing, spot welding, or the like. By means of this construction the resistance of the heating elements 80 may be increased which reduces the amount of heating current required, and consequently, the size of the conductor cables 76 and 77.

Figures 7, 8:
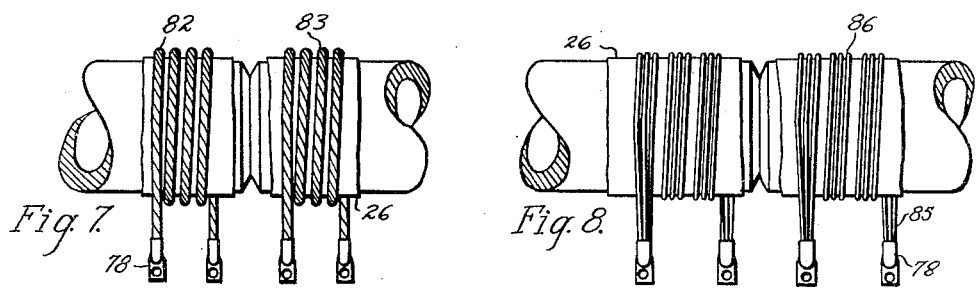
Fig. 7 illustrates an application of one form of a flexible heating element.
Fig. 8 illustrates the application of another form of heating element.
Figure 9:
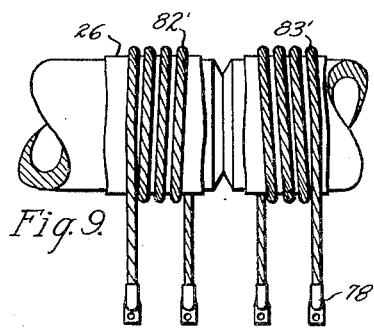
Fig. 9 illustrates an alternate method of application of the heating element of Fig. 6.

Figs. 7 and 9 illustrate methods of application of flexible heating elements 82 and 83 each of which is preferably comprised of a bare stranded conductor cable of relatively high resistance, which is capable of withstanding relatively high temperatures without appreciable corrosion, and which is provided with terminal members 78 in any suitable manner, for facilitating connection thereto. For example, I have found that a stranded cable comprising a plurality of wires of a nickel-chromium alloy is very satisfactory in this respect, and it may be readily applied, either for heating by the combined inductive and resistance effects, as in Fig. 7, or for resistance heating alone, as, for example, the heating elements 82' and 83' in Fig. 9, by being wrapped about the member on a layer of asbestos paper 26.

A modified form of heating element is shown in Fig. 8, and comprises a flexible cable 85 of a plurality of separate stranded cables 86 of resistance heating material, having terminal members 78 secured thereto at each end for connecting the separate cables to provide a substantially flat flexible heating element which may be readily wrapped around the members which are being welded, and will lie in close conformity with the surface thereof.

Figure 6:
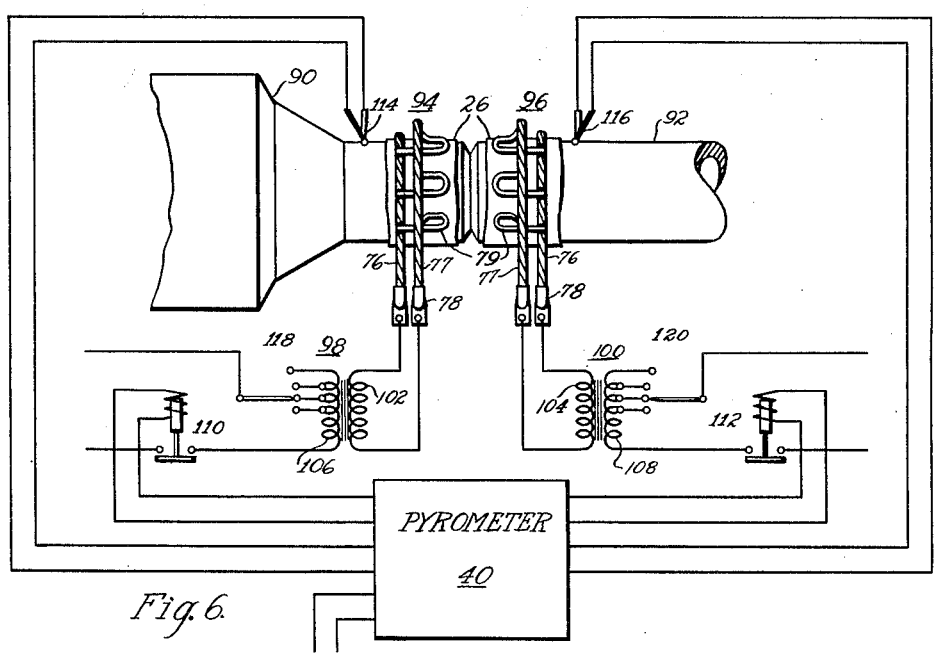
Fig. 6 illustrates schematically a further modification of the system of my invention.

Referring to Fig. 6, which discloses a further modification of control which may be used in connection with the preheating and annealing of members being welded, the reference numerals 90 and 92 may denote, respectively, members upon which a welding operation is to be performed. Heating elements 94 and 96 may be wrapped about the members upon layers of suitable heat-resisting insulating material 26, so that the heating members 79 lie in substantially close contact with the surface of the pipe members, and if desired, an additional layer of insulating material may be placed over the heating elements, as in Fig. 1, to reduce radiation and convection losses therefrom. Transformers 98 and 100 may be provided having the secondary windings 102 and 104 thereof connected to the conductor cables 76 and 77 of the heating elements 94 and 96, respectively. The primary windings 106 and 108 of the transformers may be connected by switches 110 and 112, respectively, to any suitable source. By controlling the energization of the switches 110 and 112 through a multiple circuit pyrometer device 40, which is connected with the thermocouples 114 and 116 in a manner well known in the art, the heating elements 94 and 96 may be selectively energized so as to maintain the members being welded at any desired temperature, for preheating and annealing the metal of the members adjacent to a point of welding.

It will be observed that, in this embodiment of the invention, the switches 110 and 112 are disposed in the primary circuits of the transformers which permits the use of switches of small current carrying capacity as compared to those used in the systems of Figs. 1 and 2. In addition, the primary windings may be provided with tap changers 118 and 120 to provide auxiliary manual control.

It will be seen that by my invention I have provided a system for controlling the preheating and annealing of members upon which a welding operation is being performed in accordance with the temperatures of the members and in accordance with the performance of the welding operation. The heating element is simple and easily applied, and it is both rugged and inexpensive. Since a bare flexible heating element is utilized, it may be readily wrapped about irregular bodies and when applied over a layer of insulating material it will lie in close conformity with variations in the surface contour, and is efficient and effective in providing for the maximum conduction of heat to the member being heated. The control means for controlling the connection of the heating element to the source may readily be built in a compact unit which can then be used with any desirable source of power, or in connection with different heating elements upon different preheating and annealing jobs.

Since certain changes may be made in the above description and different embodiments of the invention may be made without departing from the scope thereof, it is intended that all matters contained in the above description or shown in the accompanying drawings, shall be considered as illustrative, and not in a limiting sense.

I claim as my invention:

1. A preheating and annealing heating element for use in preheating and annealing members on which a welding operation is to be performed comprising, a plurality of substantially parallel stranded flexible conductor members of relatively high resistance arranged in side-by-side relation in the same plane and terminal means integral therewith for connecting the conductor members to provide a substantially flat flexible element which may be wrapped about a member upon which a welding operation is to be performed for heating said member.

2. A flexible heating unit for use in preheating and annealing of members upon which a welding operation is to be performed, comprising a pair of flexible conductor members and a plurality of substantially rigid resistance heating elements secured to the conductor members at spaced intervals for maintaining them in spaced relation and providing an integral flexible heating member for wrapping about the member being welded.

3. A system for preheating a member upon which a welding operation is to be performed comprising, a heating element disposed to be positioned about the member adjacent the zone of welding, means responsive to the temperature of the member adjacent the zone of welding effective to control the energization of the heating element from a source of electrical energy, and control means responsive to the commencement of a welding operation operable to render the said means ineffective during a welding operation.

4. A control system for controlling the preheating and annealing treatment of members on which a welding operation is to be performed comprising, an insulating coating adapted to be wrapped about each member adjacent to the area to be treated, a plurality of heating elements disposed to be wound in spaced turns about the members on each side of the zone to be treated, a transformer having a primary winding for connection to a source of alternating current and a secondary winding, and control means responsive to the temperature changes of the members being treated normally effective to control the connection of the associated heating elements to the secondary winding of the transformer to maintain the members at predetermined temperatures, and means responsive to the commencement of a welding operation operable to render the control means ineffective for a predetermined time after termination of the welding operation.

5. The combination with a welding circuit connected to a source of current for performing a welding operation on a member, of a flexible heating element adapted to be positioned about the member for applying heat thereto for preheating and annealing the zone of the welding operation, and control means for controlling the connection of the resistance element to the source including means responsive to the temperature of the member normally operable to maintain a predetermined temperature, and means responsive to the energization of the welding circuit operable to render the temperature responsive means ineffective during a welding operation.

6. The combination with a welding system including a welding transformer and a fusible electrode for performing a welding operation on a member, of heating means connected to the welding transformer and adapted to be wrapped about the member adjacent the zone of welding, switch means controlling the connection of the heating means to the welding transformer, means responsive to the temperature of the member normally effective to control the connection of the heating to the welding transformer to maintain the member at a predetermined temperature, and means responsive to the commencement of a welding operation effective to disconnect the heating means from the welding transformer until a predetermined time after the cessation of the welding operation.

7. The combination with a welding system which includes a source of current and a welding circuit connected therewith including a fusible electrode for performing a welding operation on a pair of members which are to be united, of a plurality of heating means adapted to be applied to the members adjacent to the point of welding, a plurality of switch means for connecting the heating means to the source, means responsive to changes in the temperature of the members for separately controlling the switch means and thereby the connection of the heating means to the source, and means responsive to the flow of current in the welding circuit for effecting disconnection of the heating means from the source during a welding operation.

8. The combination with a welding system which comprises a welding circuit including a fusible electrode for performing a welding operation on a pair of members disposed to be united by the welding operation and a source of current for the welding circuit, of a system for preheating and annealing the weld zone comprising, flexible heating elements adapted to be placed about the members adjacent to the weld zone, switch means for connecting the heating elements to the source of current, temperature control means responsive to temperature changes of the members for selectively controlling the operation of the switch means and thereby the energization of the heating elements to maintain a predetermined temperature for preheating the members, and means responsive to the flow of current in the welding circuit to discontinue the preheating operation during a welding operation, said means being operable to effect reenergization of the heating elements a predetermined time after cessation of a welding operation, and said temperature control means being capable of adjustment to maintain a higher predetermined annealing temperature subsequent to the cessation of a welding operation.

9. A system for preheating and annealing the weld zone of members upon which a welding operation is to be performed by a welding circuit comprising a relatively thin layer of heat resisting insulating material adapted to be positioned about each member adjacent to the zone of the welding operation, heating means including a pair of relatively flexible cables of relatively high resistance material adapted to be positioned about the members on the insulating material and in close conformity with the surface of the members, a common transformer connected to a source of current for supplying electric energy to the welding circuit and to the heating means, control means responsive to the temperature of each member for controlling energization of the heating means associated therewith, and means responsive to the energization of the welding circuit for immediately effecting deenergization of the heating means.

10. The combination with a welding circuit including a fusible electrode for performing a welding operation on a pair of members which are to be joined and a source of electrical energy for the welding circuit, of preheating and annealing means comprising a layer of asbestos material adapted to be disposed about each member adjacent to the point of welding, a heating element comprising a flexible cable of nickel chromium alloy resistance wire adapted to be positioned about each member on the insulated portion to closely conform with the surface contour, a layer of heat insulating material disposed about the insulated portion to cover the heating element, switch means for separately connecting the heating elements to the source, control means responsive to changes in the temperature of each member for separately controlling the switch means to effect the connection of the associated heating element to the source, and means responsive to the flow of current in the welding circuit for preventing connection of the heating elements to the source during a welding operation.

11. The combination with a welding system comprising a welding circuit including a fusible electrode for performing a welding operation on a pair of members and a source of current for the welding circuit, of a plurality of spaced turns of bare stranded heating cables of relatively high resistance material adapted to be positioned about each member adjacent to the zone of welding, a relatively thin layer of asbestos material adapted to be positioned between the cable and the member, a covering of insulating material encasing the cable and the member, switch means for connecting the cables to the source for applying external heat to the members, means responsive to changes in the temperatures of the members for separately controlling connection of the cables to the source, and time delay means responsive to the flow of current in the welding circuit for preventing connection of the cables to the source until a predetermined time after cessation of a welding operation.

HARRY H. BATES.